Patented June 8, 1926.

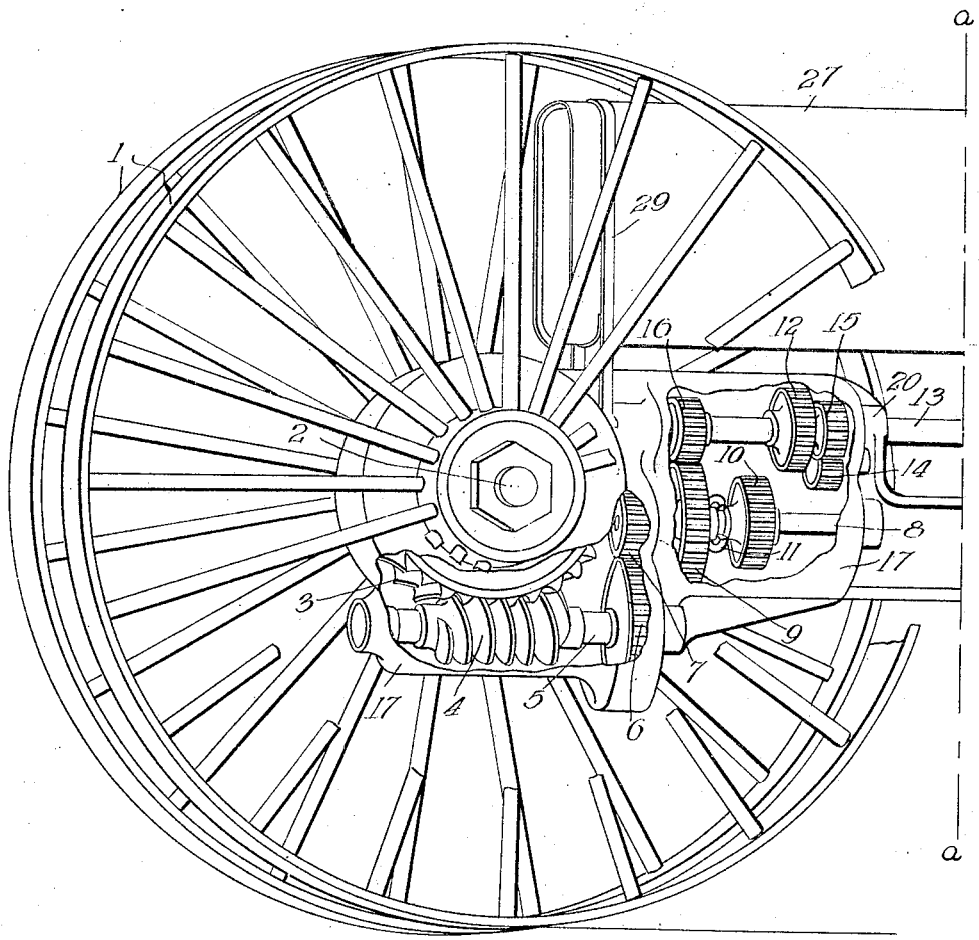

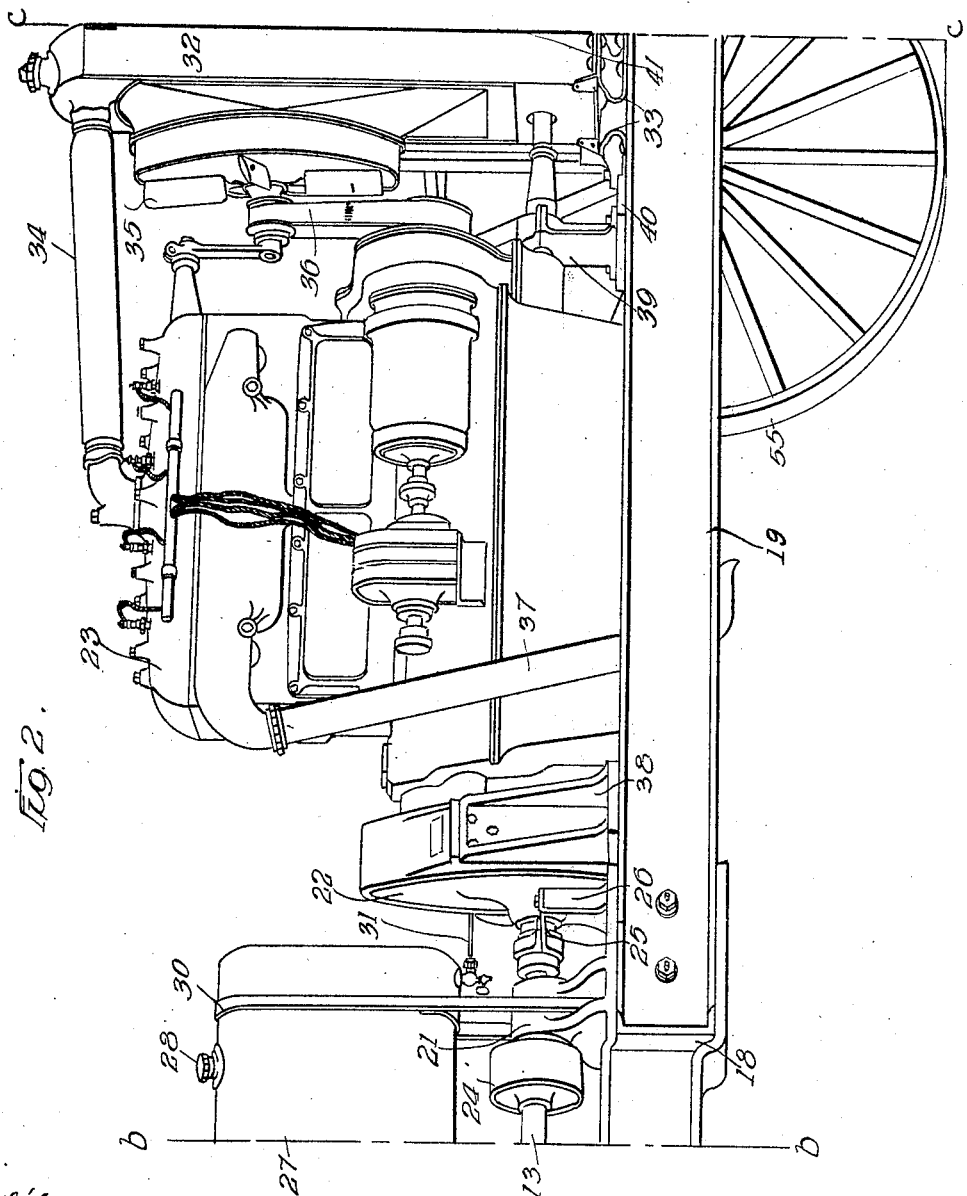

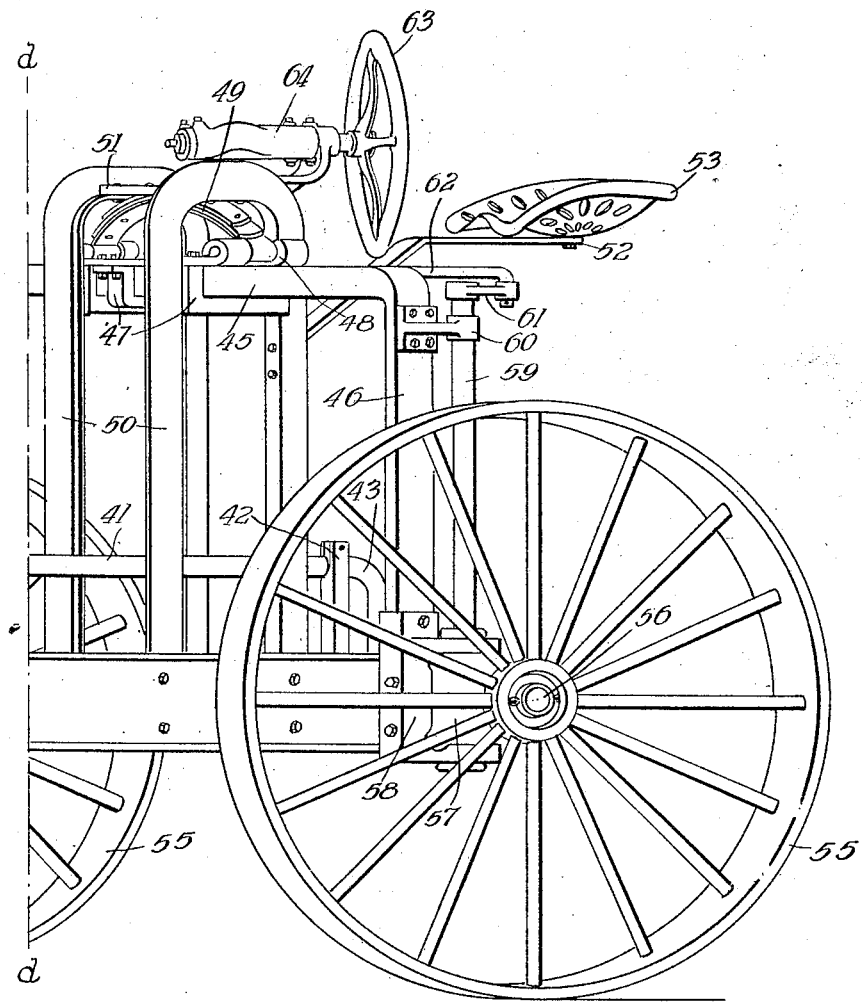

1,587,561

UNITED STATES PATENT OFFICE.

LAWRENCE Y. SPEAR, OF NEW LONDON, CONNECTICUT.

TRACTOR.

Application filed September 2, 1922. Serial No. 585,865.

My invention relates to motor driven vehicles, particularly those of the traction engine or tractor type, and is directed toward certain improvements to the ends of simplicity of construction, simplicity and compactness of assembly, reliability of operation, and ease of control, the provision of an improved drive, the provision of an improved arrangement of parts, and the provision of an improved control, including an improved driving and steering arrangement.

An embodiment of the invention is illustrated in the accompanying drawings, in which:

Figures 1, 2, and 3 are side elevational views at a slight angle of the forward intermediate and rear portions respectively of a tractor embodying the features of the present invention, (a complete side elevation at a slight angle is had by arranging Figure 2 to the right of Figure 1 with the line b—b thereof coincident with the line a—a of Figure 1 and Figure 3 to the right of Figure 2 with the line d—d thereof coincident with the line c—c of Figure 2).

Referring to the drawings, the driving or traction wheels 1—1 are keyed, splined or otherwise suitably fixed upon the drive axle 2 arranged at the forward end of the tractor. These wheels 1—1 are arranged relatively close together to provide the minimum tread consistent with the necessary stability of the machine when used as a cultivator or for other like work. When the tractor is to be used for heavier work, such as plowing or pulling heavy loads, extension rims may be attached to both of the wheels 1—1, these extension rims may have suitable weights or lugs or cleats for obtaining the desired traction.

The front axle 2 is driven through a worm-wheel 3 splined, keyed or otherwise suitably fixed thereupon. This worm-wheel 3 meshes with a driving worm 4 fixed upon a shaft 5. The worm-wheel 3 and cooperating worm 4 are suitably proportioned to give the desired amount of gear reduction. A spur-gear 6 fixed upon the shaft 5 meshes with a pinion 7 fixed upon a counter-shaft 8, the drive being transmitted from the counter shaft 8 to the shaft 5 through these cooperating gears 6 and 7, and thence to the driving wheels 1—1, through the worm 4, co-operating worm wheel 3 and drive axle 2.

The countershaft 8 is driven either through a low speed gear 9 or a high speed gear 10, splined upon the shaft 8 and shiftable there-along as a unit through a fork 11 and the usual or any preferred shifting connection (not shown) extended to a point adjacent the driver's seat. The high speed gear 10 is adapted for driving engagement with a co-operating high speed drive pinion 12 fixed upon the main driving shaft 13 to obtain high speed forward or with an idler pinion 14 driven from the shaft 13 through a co-operating pinion 15 fixed thereupon to drive the tractor in the reverse direction. The low speed gear 9 is adapted for driving engagement (Figure 1) with a cooperating low speed drive pinion 16 fixed upon the driving shaft 13 to obtain low speed forward of the tractor. If a second speed reverse is desired the same could be had by arranging a driving pinion and cooperating idler forward of the low speed pinion 16, in which event second speed reverse would be had by shifting the gear 9 forwardly along the shaft 8 into driving engagement with such additional idler. Additional variations in speed may be had by increasing the number of gears for transmitting the drive from the driving shaft 13 to the counter shaft 8.

The transmission gearing between the shafts 13 and 8 as well as the pinion 7, spur-gear 6, worm 4, worm wheel 3, shaft 5 and front axle 2 are incased or enclosed in a frame 17, the rear end of which frame is flared or flanged out as shown at 18 to receive the forward end of the main chassis frame 19 which frame is bolted or otherwise securely connected therewith. In addition to enclosing the entire driving and change speed mechanism between the driving shaft 13 and the drive axle 2, the frame 17 provides suitable bearings or journals for the driving shaft 13, countershaft 8, worm shaft 5 and for the drive axle 2.

The driving shaft 13 continues rearwardly from the bearing or journal 20 provided by the frame 17 through an upright bearing 21 carried by the rear or flanged out portion 18 of the frame 17 and connects at its rear end with the engine clutch 22 arranged within the fly-wheel associated with the engine 23. A pulley 24 mounted upon the shaft 13 between the bearings 20 and 21 provides a power take-off from which power may be taken as through a suitable belt when so desired. A tranversely arranged strap 25 pivoted at one end on a bracket 26 mounted upon the left hand longitudinal frame member of the main chassis frame is connected intermediate its length through an arched portion and a co-operating band or clamping member with the clutch 22. The opposite end of the strap 25 is pivotally connected through a longitudinal connecting link (not shown) with a suitable clutch shifting lever arranged for convenient access from the driver's seat.

The gasoline tank 27 provided with a suitable filler cap 28 is supported in a longitudinal position in a supporting cradle comprising upright braces 29 and 30 mounted at the forward and rear ends respectively of the frame 17. The usual supply tubing 31 extends from the tank 27 to the carbureter (not shown) from which a combustible mixture is supplied to the engine 23 in the usual or any preferred manner.

To the rear of the engine 23 is a radiator 32 mounted upon the main chassis frame 19 through suitable springs 33. The mounting springs 33 relieve the radiator 32 of all undue shocks. Communication between the engine 23 and the radiator 32 is had by way of a suitable conduit 34. A suitable cooling fan 35 arranged just forward of the radiator 32 is driven from the engine 23 as for example, through a suitable driving belt 36. An exhaust pipe 37 conveys the exhaust gases from the engine. The forward end of the engine 23 is supported by two bracket members 38, one mounted upon each of the longitudinal frame members of the main chassis frame 19. The opposite end of the engine is supported by a single bracket member 39 mounted upon a crossmember or supporting brace 40. A starting crank shaft 41 extends through the base of the radiator 32 and out to the rear of the chassis frame 19 where it is supported in a bearing 42. The rear end of the shaft 41 is provided with a suitable crank handle 43. The frame 17 protects the gearing enclosed therein and is adapted to hold a suitable grease or oil in which the gears are thereby permitted to run.

The rear axle of the vehicle comprises a pair of similar axle sections preferably of square stock, bent or otherwise formed to produce substantially horizontal mounting portions 45 and substantially vertical wheel carrying portions 46. These axle sections are adjustable so that the tread of the rear wheels can be increased or decreased as desired. The substantially horizontal mounting portions 45 of these axle sections are mounted side by side for sliding adjustment in a horizontal plane in bearing members 47 which bearing members are bolted or otherwise suitably mounted upon a cross plate 48, the opposite ends of which plate are notched as shown to receive the opposite ends of a suitable leaf spring 49 from which spring, the plate 48 is suspended for vertical sliding movement between the downwardly extending legs of frame members 50—50, one of which is mounted in an upright position upon each of the longitudinal frame members of the main chassis frame 19 of the vehicle. The spring 49 is in turn supported from a cross plate 51 extending transversely between the frame members 50—50 and secured at its opposite ends thereto. The cross plate 51 forms not only a support at its center for the leaf spring 49, but in addition carries a seat spring 52 upon the outer end of which the driver's seat 53 is mounted. By this arrangement, the rear axles are not only adjustable for varying the tread of the rear wheels, but a spring effect is had through the spring 49 for effectively absorbing the shocks to which such vehicles are subjected. A draw-bar plate (not shown) may be adjustably secured to the rear side of the frame members 50—50. A more detailed description of this draw bar plate as well as the rear axle construction thus far described may be obtained from my copending application, Serial No. 585,866, filed September 2, 1922.

The tractor of the present invention, however, is steered through the rear wheels 55—55, each of which wheels is mounted upon a spindle 56 carried by a steering knuckle 57 mounted in a block 58, one of which blocks is secured to the lower free end of each of the vertically extending portions 46 of the rear axle sections. The wheels 55—55 are turned about vertical axes to steer the vehicle in the desired direction by rotating the knuckles 57 about their vertical axes by means of vertically extending rotatable rods or shafts 59, each of which projects up through a bearing bracket 60 and is connected through a link 61 with the rear free end of a control or drag rod 62. The drag rod 62 is actuated to impart the desired rotation to the rods or shafts 59 and consequently the desired turning to the wheels 55—55 by means of a steering wheel 63 connected through a worm and rack enclosed within a housing 64 to the forward end of the drag or control rod 62. The rod 62 is preferably of telescopic construction so that its length can be increased or decreased according to the adjustment made to the tread of the wheels 55—55 through the adjustable axle sections.

It will be clear to those skilled in the art that while I have illustrated and described a particular arrangement of the various novel features of my invention that not only are certain of these features applicable in connection with other types of vehicles, but that they as well as the particular arrangement disclosed are subject to modifications and changes without departing from my invention, the scope of which is set forth in the appended claims. The drive wheels may be positioned at the rear, and the frame 17 arranged to carry the attachments for the seat and draw-bar, as well as suitable brackets for the steering gear, motor and clutch controls.

I claim:

1. In a vehicle of the class described, a drive axle, a pair of relatively large drive wheels spaced relatively close together on said axle, a worm wheel on the axle between said drive wheels, a worm shaft arranged longitudinally of the vehicle between the drive wheels and having a driving worm meshing with the worm wheel to transmit the driving effort of the worm shaft to the drive axle, a driving shaft and an intermediate shaft superposed above the worm shaft and above one another and both arranged longitudinally of the vehicle to minimize the lateral space required, the worm and intermediate shafts having a spur pinion of relatively small diameter and a spur gear of relatively large diameter cooperating to transmit the driving effort of the intermediate shaft to the driving worm, and change speed gears connecting the longitudinally arranged and superposed driving and intermediate shafts.

2. In a vehicle of the class described, a relatively short drive axle, a pair of relatively large diameter drive wheels spaced relatively close together and each fixed on said drive axle, a relatively long narrow casing extending between the drive wheels, a driving motor, means within the casing for transmitting the driving effort from the motor to the drive wheels, said means including a worm wheel fixed on the axle, a worm shaft arranged longitudinally of the vehicle and having a driving worm meshing with the worm wheel, and a spur gear of relatively large diameter, an intermediate shaft superposed above the worm shaft and having a spur pinion of relatively small diameter meshing with said spur gear, a driving shaft superposed above the intermediate shaft and extending through an opening in the casing to the driving motor, the intermediate and driving shafts being arranged longitudinally of the vehicle and change speed gears connecting the driving and intermediate shafts and enclosed in the casing.

3. In a vehicle of the class described, a relatively short drive axle, a pair of relatively large diameter drive wheels spaced relatively close together and each fixed on the drive axle, a relatively long narrow casing extending between the drive wheels, a driving motor, and means within the casing for transmitting the driving effort from the motor to the drive wheels, said means including a driving shaft, a shaft having driving connection with the drive wheels to transmit its driving effort thereto, and an intermediate shaft all superposed one above the other and arranged longitudinally of the vehicle, and change speed means connecting the driving and intermediate shafts.

In witness whereof, I hereunto subscribe my name this 25 day of August, 1922.

LAWRENCE Y. SPEAR.